Jan. 14, 1947. G. R. ERICSON 2,414,225
COMBUSTION CHAMBER FOR DIESEL ENGINES
Filed Jan. 22, 1944

INVENTOR
GEORGE R. ERICSON

Patented Jan. 14, 1947

2,414,225

UNITED STATES PATENT OFFICE 2,414,225

COMBUSTION CHAMBER FOR DIESEL ENGINES

George R. Ericson, Kirkwood, Mo.

Application January 22, 1944, Serial No. 519,367

4 Claims. (Cl. 123—32)

This invention relates to combustion chambers for Diesel engines and particularly to engines designed to operate at high speeds by self-ignition. It will be understood that such engines are broadly old in the art, as shown by British Patent 29,337 of 1912 to Crossley. Such engines are provided with a combustion chamber at the inner end of the cylinder, and the fuel is sprayed from a high pressure nozzle across the combustion chamber toward the inlet of an ignition bulb or supplementary combustion chamber. The fuel injection is timed to occur during the last 30° of crankshaft travel of the compression stroke. This spray passes through the combustion chamber in which the air is heated by compression to a temperature considerably above the ignition temperature of the fuel used, and part of the spray passes into a hot bulb located on the other side of the combustion chamber. At some point in this hot bulb, a mixture of detonating proportions will be formed to explode with the result that the hot bulb fires back across the combustion chamber. This backfire causes violent turbulence in the combustion chamber and a further pressure increase to a point at which the fuel is instantly vaporized and burned.

One of the difficulties with the Crossley type of engine is that the hot blast from the hot bulb explosion would strike the walls of the combustion chamber in such a manner as to actua'ly cool the hot blast, thereby losing power from the explosion and also causing the deposition of carbon on the walls of the combustion chamber at the point at which the hot blast is directed. It will be understood that the deposition of carbon by the hot bulb blast will occur only at a comparatively short range from the mouth of the hot bulb and in larger engines this difficulty does not arise. However, in high speed engines having a cylinder bore in the order of six inches or less and a combustion chamber diameter of less than three inches, the blast from the hot bulb strikes the wall of the combustion chamber at such a short range that the problem of carbon deposition and power loss becomes serious.

It might be suggested that the difficulty be overcome by increasing the diameter of the combustion chamber, except for the fact that this dimension must be kept to a minimum for an engine of a given power, and, preferably, the main effective diameter of the combustion chamber should not be greater than one-half of the cylinder bore while the height should be not more than one-fourth of the stroke. Another reason for maintaining a small combustion chamber diameter is that the most efficient position for the tip of the spray nozzle is a point approximately 2½ inches from the mouth of the hot bulb.

For the reasons above stated, the designer of high speed Diesel engines is faced with the opposite requirements of having his combustion chambers small enough to allow him to place the tip of his injection nozzle within two or three inches of the mouth of the hot bulb, while the said mouth should be placed at least three inches, and preferably more, from the nearest metallic surface capable of cooling the core of its blast. This problem is solved, according to my invention, by forming the combustion chamber with a diameter substantially greater than three inches and preferably approximately one-half of the cylinder diameter for engines of not more than 6" bore. The length or height of the combustion chamber is made, preferably, slightly less than one-fourth of the stroke of the engine. In order to obtain the greatest travel possible for the blast from the hot bulb, I position it so that the excess of its blast does not strike the opposite wall of the combustion chamber, but is directed into a chamber formed by cutting away a portion of the wall of the combustion chamber and the adjacent part of the cylinder head in such a manner as to allow the core of the hot blast to travel substantially all the way to the outer wall of the cylinder without striking any metallic surfaces. This cut-away passage is comparatively limited in volume but is designed so that the total volume of the main combustion chamber, the hot bulb, and the blast passage has the desired ratio with respect to the volume swept by the piston in its stroke which may be in the order of fifteen or sixteen to one.

The invention will be better understood upon reference to the following specification and accompanying drawing, in which Figure 1 is a longitudinal sectional view of a cylinder head, cylinder, and piston according to my invention.

Figure 1:
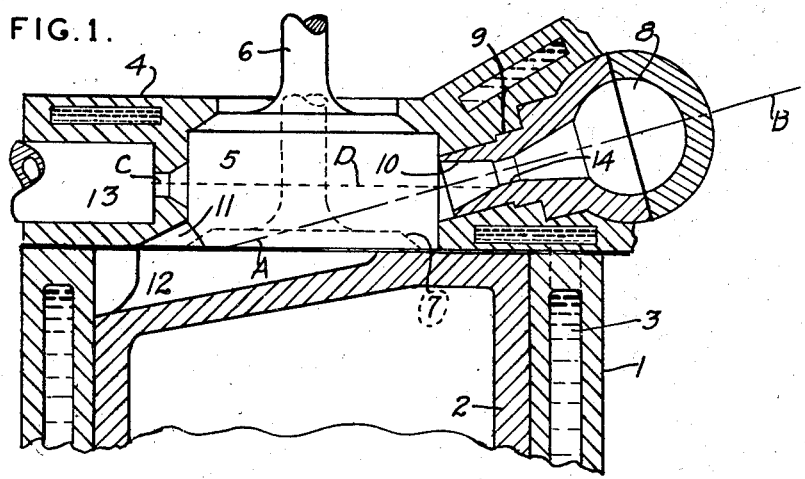
Figure 3:
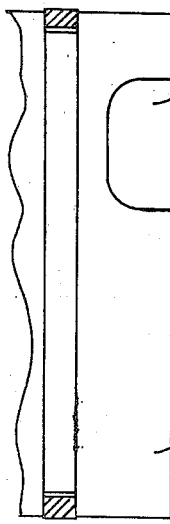
Figure 3 is a side view of a portion of the piston shown in Figure 2.
Figure 2:
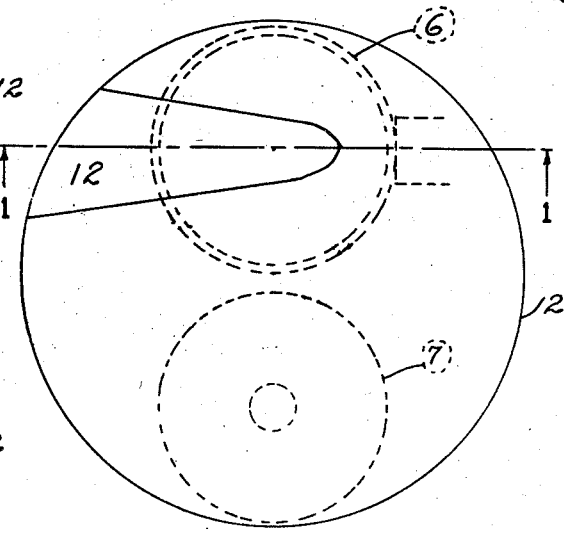
Figure 2 is a diagrammatic plan view of the piston shown in Figure 1.

The reference numeral 1 indicates the cylinder block of an engine having a piston 2, water jacket 3, and head 4. The cylinder head is provided with a combustion chamber 5 located under the inlet valve 6 which is in the position indicated by dotted lines in Figure 2. An exhaust valve 7, shown only in dotted lines, is located on the opposite side of the cylinder substantially in the plane of separation of the cylinder and cylinder head. A hot bulb 8, formed of refractory metal, is fitted into a bore 9 in the cylinder head in such a manner as to be comparatively loose when the temperature is low, but to fit tightly for better heat transfer when the temperature is high. This is accomplished by reason of the fact that the cylinder head is water-jacketed or otherwise better cooled than the hot bulb which accordingly expands more due to the greater rise in temperature.

The hot bulb may be of substantially conventional construction, but I prefer to have a discharge outlet 10 formed with a total inclined angle of approximately 20° for the purpose of obtaining a more directed expansion of the blast from the hot bulb. The axis of the hot bulb is on the line A—B, and the opposite wall of the combustion chamber is cut away, as indicated at 11, to permit the heat core of the blast to completely miss the wall and pass on into the blast passage 12 which is formed by cutting away a portion at the top of the piston, as shown.

The fuel nozzle 13 discharges in the axis C—D which is generally directed towards the mouth 10 of the hot bulb. The tip of the spray plume enters the mouth of the hot bulb chamber just as the piston 2 is approaching the end of its upward travel, and while the compressed air is continuing to flow into the hot bulb as it is displaced from the cylinder proper, this air current sweeps vaporized fuel into the hot bulb, but due to the angular position of the mouth 10 and the limited size of the bore 14, the comparatively large droplets at the center of the spray plume do not directly enter the hot bulb but impinge on the red hot metal and are vaporized. The medium sized droplets, together with the vaporized fuel, may be swept into the hot bulb by the air flow from the ascending piston, so that when the detonation occurs in the hot bulb, the direction of any unvaporized droplets is immediately reversed, and they are discharged at high velocity across the combustion chamber and into the blast passage 12.

In operation, the fuel injection from the nozzle 13 begins at a point about 20° or 25° before top dead center of the piston, and the spray plume then begins to develop across the combustion chamber. The outer envelope of the spray plume is in contact with intensely heated air and therefore begins to burn almost as soon as the spray enters the combustion chamber, but this burning is comparatively limited in amount, because the combustion zone is only the conical surface of the spray plume and cannot extend either to the combustion chamber generally or to the core of the spray plume. This core cannot burn, because it is cooled by reason of its own vaporization which is due to the velocity with which it is discharged from the nozzle. Also, the core of the spray plume cannot burn, because it is almost pure vapor with very little air.

As this plume reaches the mouth of the hot bulb, it is swept into the hot bulb by the continued compression of air as the piston completes its upward travel. By the time the spray gets well up into the hot bulb, it meets the highly heated, pure air therein, and a detonating mixture is formed, which forms a blast of extremely high velocity which extends across the combustion chamber, creating violent turbulence therein, and proceeds into the blast passage 12 which forms a pocket of highly heated air which is not fully mixed with the fuel containing air in the combustion chamber until the piston begins to drop downwardly on the power stroke, at which time a further combustion or explosion of the mixture occurs. Thus, the combustion of the fuel occurs in four distinct, but closely spaced periods, and results in a very smooth running engine.

I claim:

1. In a fuel injection engine, a cylinder having a diameter in the order of six inches or less, a combustion chamber having a diameter in the order of three inches or less, said combustion chamber having a fuel injection nozzle mounted in one side thereof, a hot bulb having a mouth in a wall of said combustion chamber substantially opposed to said nozzle and positioned to receive a portion of the fuel discharged therefrom, said combustion chamber having an extension forming a blast passage aligned with the axis of said mouth and positioned in the direct path of gases discharged from said bulb through said mouth, said blast passage extending to a point beyond the limit of said combustion chamber to permit travel of the blast from the hot bulb for a distance greater than the diameter of the combustion chamber before striking the cooled surface of the combustion chamber walls.

2. In an injection engine, a cylinder, a piston, a combustion chamber at one end of said cylinder, said combustion chamber being of substantially one-half the cylinder diameter and having a length substantially one-fourth of the piston stroke, a nozzle and a hot bulb mounted at substantially spaced points in the wall of said combustion chamber, the line of discharge of said nozzle being directed at said bulb, and the line of discharge of said bulb being directed to one side of said nozzle, and means forming a blast passage in the line of discharge of said hot bulb and extending beyond said nozzle to permit unobstructed escape of the hot blast from said bulb.

3. In an injection engine, a cylinder, a combustion chamber formed at one end of said cylinder, a hot bulb mounted in a wall of said combustion chamber, a fuel nozzle positioned in another wall of said combustion chamber at a distance not more than 2½ inches from the mouth of said hot bulb, said combustion chamber being substantially circular and having a diameter not substantially greater than three inches and having walls forming a blast passage having a mouth adjacent to but spaced from said nozzle and positioned to receive gases discharged from said hot bulb and substantially more than three inches from the mouth of the bulb.

4. In an injection engine including a cylinder, a cylinder head, and a piston, a combustion chamber formed in the cylinder head and having a valve opening therein, said combustion chamber being substantially circular and having a diameter substantially smaller than that of the cylinder, a fuel injector opening into said combustion chamber for directing fuel thereacross, an air cell in said cylinder head constructed and arranged to receive a portion of the discharge from said injector, and a recess in the upper end of said piston extending in the direction of discharge from said air cell to a distance therefrom greater than the diameter of said combustion chamber and terminating in a space between the cylinder head and piston, said recess forming an additional combustion chamber for receiving the core of the air cell discharge.

GEORGE R. ERICSON.